United States Patent
Arkles et al.

(10) Patent No.: US 9,145,474 B2
(45) Date of Patent: Sep. 29, 2015

(54) METHOD FOR PRODUCING SILICONE STEP-GROWTH ELASTOMERS FROM DUAL FUNCTIONAL SILOXANES

(71) Applicant: Gelest Technologies, Inc., Morrisville, PA (US)

(72) Inventors: Barry C. Arkles, Pipersville, PA (US); Jonathan D. Goff, Philadelphia, PA (US)

(73) Assignee: Gelest Technologies, Inc., Morrisville, PA (US)

(*) Notice: Subject to any disclaimer, the term of this patent is extended or adjusted under 35 U.S.C. 154(b) by 0 days.

(21) Appl. No.: 14/200,134

(22) Filed: Mar. 7, 2014

(65) Prior Publication Data
US 2014/0275406 A1  Sep. 18, 2014

Related U.S. Application Data

(60) Provisional application No. 61/783,359, filed on Mar. 14, 2013.

(51) Int. Cl.
| | | |
|---|---|---|
| *C08L 83/14* | (2006.01) | |
| *C08G 77/38* | (2006.01) | |
| *C08L 83/04* | (2006.01) | |
| *C08G 77/12* | (2006.01) | |
| *C08G 77/20* | (2006.01) | |

(52) U.S. Cl.
CPC ............... *C08G 77/38* (2013.01); *C08L 83/04* (2013.01); *C08L 83/14* (2013.01); *C08G 77/12* (2013.01); *C08G 77/20* (2013.01)

(58) Field of Classification Search
None
See application file for complete search history.

(56) References Cited

U.S. PATENT DOCUMENTS

| | | | | |
|---|---|---|---|---|
| 4,013,611 A | * | 3/1977 | Hechtl et al. | ............... 523/212 |
| 6,124,407 A | * | 9/2000 | Lee et al. | ................. 525/478 |
| 2013/0041098 A1 | | 2/2013 | Arkles et al. | |

FOREIGN PATENT DOCUMENTS

JP  2005-336327  * 12/2005

OTHER PUBLICATIONS

Machine generated translation of JP 2005-336327 into English.*

* cited by examiner

*Primary Examiner* — Marc Zimmer
(74) *Attorney, Agent, or Firm* — Panitch Schwarze Belisario & Nadel LLP

(57) ABSTRACT

A convenient, practical method for forming elastomers from dual functional siloxanes that cure by a step-growth mechanism is provided. The method involves preparing a first mixture containing a first telechelic siloxane and a hydrosilylation catalyst; preparing a second mixture containing a second telechelic siloxane and a dual functional siloxane having two different polymer termini; and reacting the first mixture with the second mixture to produce the siloxane elastomer. The first and second mixtures may be stored separately until time of use.

18 Claims, No Drawings

METHOD FOR PRODUCING SILICONE STEP-GROWTH ELASTOMERS FROM DUAL FUNCTIONAL SILOXANES

CROSS-REFERENCE TO RELATED APPLICATIONS

This application claims priority to U.S. Provisional Application No. 61/783,359, filed Mar. 14, 2013, the disclosure of which is hereby incorporated by reference.

BACKGROUND OF THE INVENTION

This invention describes a method for producing silicone elastomers from dual functional siloxanes. Methods for forming elastomers from two-component or two-part room temperature vulcanizing (RTV) silicones are well-established in the art. A typical two-component system based on an "addition" or hydrosilylation cure consists of a Part A, which contains a vinyl-functional base polymer, a catalyst, and optionally a reinforcing component (such as a siliceous component or reinforcing resin and pigment), and a Part B, which typically contains the same vinyl-functional base polymer and a hydride-functional crosslinking polymer. When the two parts are mixed, the crosslinking reaction commences and an elastomer forms. The rate and temperature of cure depend on the nature of the catalyst and various modifiers and inhibitors of the catalyst function. This simple system works well for traditional silicone elastomers, but is not effective for step-growth elastomers which do not rely on crosslinking, but rather on the formation of extremely high molecular weight linear polymers. Any low-molecular weight functional contaminant is likely to destroy the near perfect stoichiometry of these materials, precluding optimum property development and introducing volatile or extractable species. One possible way of creating a two-component system is to disperse the hydrosilylation catalyst in a high molecular nonfunctional silicone. However, practically speaking, if the molecular weight of the silicone is high enough to avoid interference with optimum property development, it is also too highly viscous to allow facile mixing.

A method for producing silicone elastomers from dual functional siloxanes is described in U.S. Patent Application Publication No. 2013/0041098 of Arkles et al. However, in some cases, it may be difficult to form elastomers with consistent properties using the methods described therein due to the difficulty in providing consistent mixing of the dual functional siloxanes with the curing catalyst. One obvious method of addressing this problem is to perform a continuous process in which the catalyst and polymer are fed at controlled rates into a mixing device, such as a static mixer or extruder, yielding consistent elastomers. However, in relatively small applications, design requirements of continuous or computer-controlled mixing may not be practical. Accordingly, a method for producing silicone elastomers from dual functional siloxanes that would be applicable to both small and large scale reactions would be desirable.

BRIEF SUMMARY OF THE INVENTION

A method for producing a silicone elastomer according to an embodiment of the invention comprises:
(a) preparing a first mixture comprising a first telechelic siloxane and a hydrosilylation catalyst;
(b) preparing a second mixture comprising a second telechelic siloxane and a dual functional siloxane having two different polymer termini; and
(c) reacting the first mixture with the second mixture to produce the siloxane elastomer.

DETAILED DESCRIPTION OF THE INVENTION

According to the invention, a method is provided for producing silicone step-growth elastomers from dual functional siloxanes. As described in more detail below, the method comprises preparing a first mixture comprising a first telechelic siloxane and a hydrosilylation catalyst, preparing a second mixture comprising a second telechelic siloxane and a dual functional siloxane having two different polymer termini, and reacting the first mixture with the second mixture to produce the siloxane elastomer.

The first mixture contains a first telechelic siloxane and a hydrosilylation catalyst. For the purposes of this disclosure, the term "telechelic" may be understood to refer to a di-end-functional polymer in which both ends possess the same functionality. The first telechelic siloxane contains two unsaturated termini such as, without limitation, vinyl, styryl, allyl, methallyl, hexenyl, or octenyl functional groups. Preferably, the telechelic siloxane is linear and monodisperse. More preferably, the first telechelic siloxane contains two vinyl functional groups. Most preferably, the first telechelic siloxane is a monodisperse vinyl-functional siloxane such as monodisperse vinyl terminated polydimethylsiloxane.

The siloxane backbone in the first telechelic siloxane may be, for example, a dialkylsiloxane such as dimethylsiloxane, ethylmethylsiloxane, diethylsiloxane, dimethylsilylethylsiloxane, or trifluoropropylmethylsiloxane, or an aromatic-substituted siloxane such as diphenylsiloxane or phenylmethylsiloxane. Preferably, the siloxane backbone is a dimethylsiloxane or a trifluoropropylmethylsiloxane. The first telechelic siloxane preferably has a degree of polymerization (DP) greater than about 10 and preferably less than 1000.

The hydrosilylation catalyst is preferably a $Pt^0$ catalyst, such as the preferred Karstedt's catalyst. However, other hydrosilylation catalysts known in the art or to be developed would also be within the scope of the invention. In a preferred embodiment, the catalyst is present in an amount of about 10-100 ppm based on the total amount of the first and second mixtures.

The first mixture may be prepared by conventional means, such as by mixing the components in a commercial mixer. However, the method of mixing is not critical, and appropriate mixing methods may be determined by routine experimentation. Preferably, mixing is performed until a uniform mixture of the two components is achieved.

The second mixture contains a second telechelic siloxane and a dual functional siloxane having two different polymer termini. The second telechelic siloxane preferably contains two hydride functional groups and is preferably linear and monodisperse. More preferably, the second telechelic siloxane is a monodisperse vinyl-functional siloxane such as the preferred monodisperse hydride terminated polydimethylsiloxane.

The siloxane backbone in the second telechelic siloxane may be, for example, a dialkylsiloxane such as dimethylsiloxane, ethylmethylsiloxane, diethylsiloxane, dimethylsilylethylsiloxane, or trifluoropropylmethylsiloxane, or an aromatic-substituted siloxane such as diphenylsiloxane or phenylmethylsiloxane. Preferably, the siloxane backbone is a dimethylsiloxane or a trifluoropropylmethylsiloxane.

Preferably, the second telechelic siloxane and the dual functional siloxane are present in the second mixture to provide approximately equal molar amounts of hydride and vinyl (or other unsaturated functionality) when the first and second mixtures are combined. In the case of telechelics with the same DP, the molecular weights are equivalent (except for the difference between two hydrides and two vinyls, for example) so the amounts would be the same. For example, if the first and second telechelic siloxanes have the same DP, the first mixture and the second mixture preferably contain the same amounts (by weight) of the first and second telechelic siloxanes. However, if the DP of one of the telechelic siloxanes is twice that of the other, they would preferably be utilized in a nominal 2:1 weight ratio so that a 1:1 ratio of vinyl to hydride is maintained.

The amount of dual functional siloxane in the second mixture is determined based on the relative amounts of the first and second mixtures that will be used to form the elastomer. That is, the dual functional siloxane makes up the bulk of the formulation after the two mixtures have been combined to form the elastomer. Once it has been determined what ratio of first to second mixture will be used, and if the second mixture will contain a filler or reinforcing agent (as described below), the necessary amount of dual functional siloxane may be calculated to ensure the correct stroichiometry between the telechelic siloxanes.

For example, if a ratio of 1:100 will be used for the first mixture to the second mixture, and if the first and second mixtures each contain 1 g of the respective telechelic siloxanes, it will be necessary to include 99 g of the dual functional siloxane in the second mixture. In that way, a 1:100 blend of the two mixtures will contain 1 g of the first telechelic siloxane (from the first mixture) and 1 g of the second telechelic siloxane from the second mixture (which contains 1% telechelic siloxane and 99% dual functional siloxane).

The dual functional siloxane preferably contains one monohydride terminus and one unsaturated functionality terminus, preferably a monovinyl terminus. Such siloxanes are described in detail in U.S. Patent Application Publication No. 2013/0041098, the disclosure of which is herein incorporated by reference in its entirety. These materials are low- to moderate-molecular weight linear siloxane polymers in which the hydride functionality and the unsaturated functionality are each attached to a different silicon atom on opposite ends of the linear siloxane polymer. These materials are liquids having viscosities in the range of about 5 to about 20,000 cSt and low polydispersities. The term "low polydispersity" may be understood to refer to a polydispersity less than about 1.6, more preferably less than about 1.4, most preferably less than about 1.2. The degree of polymerization of the siloxanes is preferably greater than 6, more preferably 6 to about 1000, most preferably about 10 to about 200. It is preferred that the dual functional materials have a ratio of substantially 1:1 of unsaturated group termini to hydride group termini within each polymer molecule. The term "substantially 1:1" means that the ratio is within about 5% of 1:1, more preferably within about 3% of 1:1. The ratio of unsaturated group termini to hydride group termini may be estimated based on a combination of $^1$H NMR, GPC, or step-growth polymerization data.

The unsaturated functionality is not particularly limited, and may be, for example, a vinyl, styryl, allyl, methallyl, hexenyl, or octenyl group. The preferred unsaturated functionality is a vinyl group. The siloxane backbone may be, for example, a dialkylsiloxane derived from a cyclotrisiloxane, such as dimethylsiloxane, ethylmethylsiloxane, diethylsiloxane, dimethylsilylethylsiloxane, or trifluoropropylmethylsiloxane, or aromatic-substituted siloxanes such as diphenylsiloxane or phenylmethylsiloxane. A preferred siloxane polymer has a dimethylsiloxane backbone and a vinyl group as the unsaturated functionality, as shown in formula (I):

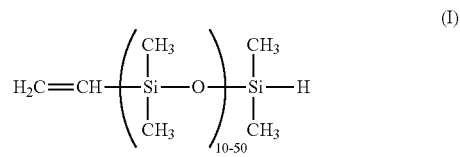

Both the second telechelic siloxane and the dual functional siloxane preferably have a degree of polymerization (DP) greater than about 10 and preferably less than 1000 and are preferably linear and monodisperse.

The second mixture may be prepared by conventional means, such as by mixing the components in a commercial mixer. However, the method of mixing is not critical, and appropriate mixing methods may be determined by routine experimentation. Preferably, mixing is performed until a uniform mixture of the two components is achieved.

It is also within the scope of the invention to include a third component in the second mixture, such as a filler or reinforcing agent. A preferred filler is fumed silica, such as the more preferred hexamethyldisilazane surface treated fumed silica with a surface area of 100-300 $m^2$/g. The filler is preferably present in the second mixture in an amount of about 15-35% by weight based on the total weight of the mixture.

It is within the scope of the invention to store the first and second mixtures separately for a prolonged period of time, such as for up to about five years. When desired, the two mixtures may be combined and reacted with each other to form the desired elastomer.

The preferred weight ratio of the first mixture to the second mixture is about 1:1 to about 1:200, more preferably about 1:50 to about 1:200. It has been found that in general, better properties are achieved by minimizing the telechelic component and thus maximizing the amount of the second mixture, which contains the dual functional siloxane. As explained above, it is important that there is a stoichiometric match between the amounts of hydride and vinyl (or other unsaturated functionality) in the first and second telechelic siloxanes. Accordingly, the amounts of telechelic siloxanes and dual functional siloxanes in the first and second mixtures should be controlled so that upon mixing, there will be equal molar amounts of the hydride and unsaturated functionality.

The reaction between the two mixtures is preferably performed at about room temperature to about 120° C.; an appropriate reaction temperature may be determined by routine experimentation. Once combined at an appropriate temperature, the components of the two mixtures react with each other to form a silicone elastomer by a step-growth mechanism. The first and second mixtures may be combined by conventional means, such as by mixing the components in a commercial mixer. However, the method of mixing is not critical, and appropriate mixing methods may be determined by routine experimentation.

The invention will now be described in connection with the following, non-limiting examples.

Comparative Example 1

Elastomer Formation from Monovinyl-Monohydride Terminated Polydimethylsiloxane 20 g of monovinyl-monohydride terminated polydimethylsiloxane (DP=50) were mixed with 3-4 drops (~0.1 g) of Karstedt catalyst containing 2 wt % platinum. Within 3 minutes an exotherm was observed. The mixture was maintained at a temperature of 50° C. Within 20 minutes a clear, tough elastomeric body formed. Rheological measurement of the cure at 50° C. at 0.5% strain and 1 Hz demonstrated tand at 5-6 minutes.

Example 1

Elastomer Formation from 2-Part 10:1 Monodisperse Step-Growth Polydimethylsiloxane System (No Filler)

A first mixture "Part A" was produced by mixing 9 g of monovinyl-monohydride terminated polydimethylsiloxane (DP=200) and 1 g of monodisperse hydride terminated telechelic polydimethylsiloxane (DP=350) in a Hauschild AM 501 mixer for 1 minute. A second mixture "Part B" was produced by mixing 1 g of monodisperse vinyl terminated telechelic polydimethylsiloxane (DP=350) with 1 drop (~0.02 g) of Karstedt catalyst containing 2 wt % platinum in a Hauschild Am 501 mixer for 1 minute. 10 g of Part A and 1 g of Part B were mixed in a Hauschild AM 501 mixer for 3 minutes, poured into an aluminum pan, and placed in an oven set at 80° C. for 2 hours. A clear silicone elastomer was formed.

Example 2

Elastomer Formation from 2-Part 100:1 Monodisperse Step-Growth Polydimethylsiloxane System (No Filler)

A first mixture "Part A" was produced by mixing 9.9 g of monovinyl-monohydride terminated polydimethylsiloxane (DP=200) and 0.1 g of monodisperse hydride terminated polydimethylsiloxane (DP=350) in a Hauschild AM 501 mixer for 1 minute. A second mixture "Part B" was produced by mixing 0.1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 0.1 g of Part B were mixed in a Hauschild AM 501 mixer for 3 minutes, poured into an aluminum pan, and placed in a oven set at 80° C. for 2 hours. A clear silicone elastomer was formed.

Example 3

Elastomer Formation from 2-Part 10:1 Monodisperse Step-Growth Polydimethylsiloxane System with 10 wt % HMDZ Fumed Silica A first mixture "Part A" was produced by mixing 8 g of monovinyl-monohydride terminated polydimethylsiloxane (DP=200), 1 g of monodisperse hydride terminated polydimethylsiloxane (DP=350), and 1 g of hexamethyldisilazane treated fumed silica (surface area of 150-200 m$^2$/g) in a Hauschild AM 501 mixer for 3 minutes. A second mixture "Part B" was produced by mixing 1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 1 g of Part B were mixed in a Hauschild AM 501 mixer for 3 minutes, poured into an aluminum pan, and placed in a oven set at 80° C. for 2 hours. A translucent, tough elastomeric body formed.

Example 4

Elastomer Formation from 2-Part 100:1 Monodisperse Step-Growth Polydimethylsiloxane System with 10 wt % HMDZ Fumed Silica A first mixture "Part A" was produced by mixing 8.9 g of monovinyl-monohydride terminated polydimethylsiloxane (DP=200), 0.1 g of monodisperse hydride terminated polydimethylsiloxane (DP=350), and 1 g of hexamethyldisilazane treated fumed silica (surface area of 150-200 m$^2$/g) in a Hauschild AM 501 mixer for 3 minutes. A second mixture "Part B" was produced by mixing 0.1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 0.1 g of Part B were mixed in a Hauschild AM 501 mixer for 3 minutes, poured into a aluminum pan, and placed in a oven set at 80° C. for 2 hours. A translucent, tough elastomeric body formed.

Example 5

Elastomer Formation from 2-Part 100:1 Monodisperse Step-Growth Polydimethylsiloxane System with 15 wt % HMDZ Fumed Silica A first mixture "Part A" was produced by mixing 8.4 g of monovinyl-monohydride terminated polydimethylsiloxane (DP=200), 0.1 g of monodisperse hydride terminated polydimethylsiloxane (DP=350), and 1.5 g of hexamethyldisilazane treated fumed silica (surface area of 150-200 m$^2$/g) in a Hauschild AM 501 mixer for 3 minutes. A second mixture "Part B" was produced by mixing 0.1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 0.1 g of Part B were mixed in a Hauschild AM 501 mixer for 3 minutes, poured into an aluminum pan, and placed in a oven set at 80° C. for 2 hours. A translucent, tough elastomeric body formed.

Example 6

Elastomer Formation from 2-Part 100:1 Monodisperse Step-Growth Polydimethylsiloxane System with 20 wt % HMDZ Fumed Silica A first mixture "Part A" was produced by mixing 7.9 g of monovinyl-monohydride terminated polydimethylsiloxane (DP=200), 0.1 g of monodisperse hydride terminated polydimethylsiloxane (DP=350), and 2 g of hexamethyldisilazane treated fumed silica (surface area of 150-200 m$^2$/g) in a Hauschild AM 501 mixer for 5 minutes. A second mixture "Part B" was produced by mixing 0.1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 0.1 g of Part B were mixed in a Hauschild AM 501 mixer for 3 minutes, poured into an aluminum pan, and placed in a oven set at 80° C. for 2 hours. A translucent, tough elastomeric body formed.

Example 7

Elastomer Formation from 2-Part 100:1 Monodisperse Step-Growth Polydimethylsiloxane System with 25 wt % HMDZ Fumed Silica A first mixture "Part A" was produced by mixing 7.4 g of monovinyl-monohydride terminated polydimethylsiloxane (DP=200), 0.1 g of monodisperse hydride terminated polydimethylsiloxane (DP=350), and 2.5 g of hexamethyldisilazane treated fumed silica (surface area of 150-200 m²/g) in a Hauschild AM 501 mixer for 5 minutes. A second mixture "Part B" was produced by mixing 0.1 g of monodisperse vinyl terminated polydimethylsiloxane (DP=350) with 1 drop (~0.02 g) of Karstedt catalyst containing 2 wt % platinum in a Hauschild Am 501 mixer for 1 minute. 10 g of Part A and 0.1 g of Part B were mixed in a Hauschild AM 501 mixer for 3 minutes, poured into an aluminum pan, and placed in a oven set at 80° C. for 2 hours. A translucent, tough elastomeric body formed.

Example 8

Elastomer Formation from 2-Part 100:1 Monodisperse Step-Growth Polydimethylsiloxane System with 20 wt % HMDZ Fumed Silica A first mixture "Part A" was produced by mixing 79 g of monovinyl-monohydride terminated polydimethylsiloxane (DP=200), 1 g of monodisperse hydride terminated polydimethylsiloxane (DP=350), and 20 g of hexamethyldisilazane treated fumed silica (surface area of 150-200 m²/g) in a Hauschild AM 501 mixer for 10 minutes. A second mixture "Part B" was produced by mixing 1 g of monodisperse vinyl terminated polydimethylsiloxane (DP=350) with 10 drops (~0.2 g) of Karstedt catalyst containing 2 wt % platinum in a Hauschild Am 501 mixer for 1 minute. 100 g of Part A and 1 g of Part B were mixed in a Hauschild AM 501 mixer for 5 minutes. The mixture was poured into an ASTM-D3182 specimen mold and placed in an oven set at 80° C. for 12 hours, followed by 100° C. for an additional 4 hours. A translucent silicone elastomer with a tensile strength of 450 psi and an elongation of 4000% was formed.

Example 9

Elastomer Formation from 2-Part 100:1 Monodisperse Step-Growth Polydimethylsiloxane System with 25 wt % HMDZ Fumed Silica A first mixture "Part A" was produced by mixing 74 g of monovinyl-monohydride terminated polydimethylsiloxane (DP=200), 1 g of monodisperse hydride terminated polydimethylsiloxane (DP=350), and 25 g of hexamethyldisilazane treated fumed silica (surface area of 150-200 m²/g) in a Hauschild AM 501 mixer for 10 minutes. A second mixture "Part B" was produced by mixing 1 g of monodisperse vinyl terminated polydimethylsiloxane (DP=350) with 10 drops (~0.2 g) of Karstedt catalyst containing 2 wt % platinum in a Hauschild Am 501 mixer for 1 minute. 100 g of Part A and 1 g of Part B were mixed in a Hauschild AM 501 mixer for 5 minutes. The mixture was poured into an ASTM-D3182 specimen mold and placed in an oven set at 80° C. for 12 hours, followed by 100° C. for an additional 4 hours. A translucent silicone elastomer with a tensile strength of 740 psi and an elongation of 6000% was formed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a linear, step-growth siloxane elastomer comprising:
   (a) preparing a first mixture comprising a first monodisperse telechelic siloxane and a hydrosilylation catalyst;
   (b) preparing a second mixture comprising a second monodisperse telechelic siloxane and a dual functional linear, monodisperse siloxane having two different polymer termini; and
   (c) reacting the first mixture with the second mixture to produce the linear, step-growth siloxane elastomer having a substantially 1:1 ratio of end groups.

2. The method according to claim 1, wherein the hydrosilylation catalyst is based on Pt(0).

3. The method according to claim 2, wherein the hydrosilylation catalyst is Karstedt's catalyst.

4. The method according to claim 1, wherein the second mixture further comprises a filler or a reinforcing agent.

5. The method according to claim 4, wherein the second mixture further comprises fumed silica.

6. The method according to claim 1, wherein a weight ratio of the first mixture to the second mixture is about 1:1 to about 1:200.

7. The method according to claim 1, wherein the dual functional siloxane has one monohydride group terminus and one unsaturated group terminus.

8. The method according to claim 7, wherein the unsaturated group terminus is selected from the group consisting of vinyl, styryl, allyl, methallyl, hexenyl, and octenyl.

9. The method according to claim 1, wherein the dual functional siloxane has one monohydride group terminus and one monovinyl group terminus.

10. The method according to claim 1, wherein the first telechelic siloxane contains two identical unsaturated functional groups selected from the group consisting of vinyl, styryl, allyl, methallyl, hexenyl, and octenyl.

11. The method according to claim 10, wherein the first telechelic siloxane contains two vinyl functional groups.

12. The method according to claim 1, wherein the second telechelic siloxane contains two hydride functional groups.

13. The method according to claim 1, wherein the first telechelic siloxane has a backbone selected from the group consisting of dimethylsiloxane, ethylmethylsiloxane, diethylsiloxane, dimethylsilylethylsiloxane, trifluoropropylmethylsiloxane, diphenylsiloxane and phenylmethylsiloxane.

14. The method according to claim 1, wherein the second telechelic siloxane has a backbone selected from the group consisting of dimethylsiloxane, ethylmethylsiloxane, diethylsiloxane, dimethylsilylethylsiloxane, trifluoropropylmethylsiloxane, diphenylsiloxane and phenylmethylsiloxane.

15. The method according to claim 1, wherein the dual functional siloxane has a backbone selected from the group consisting of dimethylsiloxane, ethylmethylsiloxane, diethylsiloxane, dimethylsilylethylsiloxane, trifluoropropylmethylsiloxane, diphenylsiloxane and phenylmethylsiloxane.

16. The method according to claim 1, wherein the first and the second mixtures are stored separately for a period of up to about five years prior to performing step (c).

17. The method according to claim 1, wherein step (c) is performed at room temperature to about 120° C.

18. The method according to claim 1, wherein step (c) comprises combining the first and the second mixtures in an appropriate ratio to achieve equal molar amounts of the first and the second telechelic siloxanes.

* * * * *